Patented Aug. 25, 1936

2,052,478

UNITED STATES PATENT OFFICE 2,052,478

MANUFACTURE OF ARTIFICIAL THREADS AND OTHER PRODUCTS FROM CELLULOSE

Leon Lilienfeld, Vienna, Austria

No Drawing. Application May 28, 1931, Serial No. 540,805. In Great Britain May 28, 1930

1 Claim. (Cl. 260—152)

The present invention is a development and modification of the process of my copending application Ser. No. 435,649 now Patent No. 2,021,862 and the copending application Ser. No. 521,020 now Patent No. 2,021,864.

In Ser. No. 435,649 I have described and claimed a process for the manufacture of artificial threads or other products, wherein a substance or substances which are capable of providing one or more unsubstituted or substituted alkyl, oxyalkyl or hydroxyalkyl groups is or are incorporated with a cellulose derivative containing one or more CSS-groups, such as viscose, and the product thus obtained is brought into the shape of an artificial material and acted upon with one or more agents, which have a coagulating effect on the shaped material and a plasticizing effect on the freshly coagulated material.

In Ser. No. 521,020 I have described and claimed broadly a process for the manufacture of artificial threads or other products, wherein a product of the action on a cellulose derivative containing one or more CSS-groups, (e. g. viscose) of a reagent other than certain reagents already claimed in Ser. No. 435,649 and halogen fatty acids and trithiocarbonic acid esters, which has a tendency to react with compounds containing hydroxyl groups so as to cause introduction of organic groups or radicals in place of the hydrogen atoms of the hydroxyl groups, is brought into the appropriate shape or form and acted upon with an agent which has a coagulating effect on the shaped material and a plasticizing effect on the freshly coagulated material.

The following classification of such suitable substances, is copied from said application 521,020, filed March 7, 1931— a. Halogen olefines (unsaturated halogen derivatives of unsaturated hydrocarbons).

b. Di- or poly-halogen-paraffins.

c. Inorganic acid esters of monohydric alcohols, or halogen derivatives of ethers of mono-hydric alcohols, or halogen derivatives of aldehydes or ketones which may be regarded as being derived from mono-hydric alcohols.

d. Inorganic acid esters or organic acid esters of di- or polyhydric alcohols (other than halogen hydracid esters).

e. Cyclic ethers of di- or poly-hydric alcohols.

f. Halogen alkylamines or halogen aralkylamines.

g. Acid halides, such as benzoyl halides.

h. Sulphochlorides of hydrocarbons, such as ortho- or para-toluene sulphochloride, naphthalene sulphochloride.

i. Quinoline sulphochloride.

j. Halogen derivatives of substituted benzoylated chloranisol.

k. Halogen derivatives of ethers of aminophenols, such as chloro-anisidine or O- or N-substitution derivatives thereof.

l. Halogen derivatives of pseudophenols, methylene quinones and quinols, for example orthooxymesityl chloride or piperonyl chloride.

m. Sulphochlorides of tertiary amines.

n. Sulphochlorides of salicyclic acid and chloro- or nitro-substitution products thereof, and sulphonamide.

o. Xanthic acid esters of any kind, for example alkyl xanthic acid esters.

p. S-oxyalkylpseudothioureas.

q. Halogen derivatives of aromatic monocarboxylic acids.

r. Halogen derivatives of cyanogen, such as cyanogen halides, or cyanuric halides (tricyanogen halides).

s. Halogen derivatives of nitrobenzene.

t. Diazonium salts.

u. Urea halides, alkylurea halides, phenylurea halides and phenylalkylurea-halides.

v. Phenyl-halogen fatty acids (for example phenyl-chloracetic acid or phenyl-chloro-propionic acid or phenyl-chloro-lactic acid or phenyl-chloro-oxyproprionic acid) or their homologues.

w. Halogen derivatives of heterocyclic ring compounds containing N in the ring, for example halogen derivatives of pyridine or its homologues or halogen derivatives of quinoline or its homologues or halogen derivatives of isoquinoline or its homologues.

x. Halogen derivatives of phenyl olefine alcohols or oxyphenyl olefine alcohols, for example cinnamic alcohol dibromide.

y. Halogen derivatives of olefine benzenes, for example α-chlorostyrol or dichloro-styrol.

z. Halogen hydracid esters of phenyl glycols, for example β-phenyl-propylene-glycol-α-chlorhydrin or benzyl-glycol-chlorhydrin or styrol dichloride.

a'. Phenyl-alkylene-oxides, for example phenyl-ethylene oxide (styrol-oxide) or phenyl-propylene oxide.

b'. Phenyl-acetylene.

In my specification Ser. No. 521,020 I have described the manufacture of artificial threads and other products from cellulose xanthate which has been incorporated with such substances as probably react with the cellulose xanthate in such a manner that one or more radicals or groups are introduced into the cellulose xanthate molecule, and that at least part of the CSS-groups contained in the cellulose xanthate remains in the product of the reaction, which is then converted into artificial materials, for example artificial threads.

The present invention is based on the observation that in the production of the mass which is to be made into artificial material (the cellulose xanthate (for example) incorporated with the said substance) it is possible, and in some cases even advantageous (whether the mass is to be treated subsequently with a plasticizing agent, as in some of my copending cases, or with any known coagulating bath) to start from cellulose xanthate which contains no water at all or only so small a quantity of water that it is not a more or less viscous liquid, but a solid or semi-solid mass, for example a paste or a lumpy mass or a soft or a rigid cake or even a flocculent mass. The product of the reaction between the cellulose xanthate in the solid or semi-solid form and the said substance, may be converted into a more or less viscous solution by adding to it an appropriate amount of water or water and caustic alkali, for example a caustic alkali solution.

The parent cellulose xanthate free from, or poor in water can be obtained either by displacing the water content in the cellulose xanthate or solution of cellulose xanthate (viscose) by means of appropriate dehydrating agents, for example ethyl alcohol or methyl alcohol and, if desired, evaporating the dehydrating agent at atmospheric or reduced pressure, or by evaporating wholly or partly the water contained in the cellulose xanthate or its solution (viscose) or by simply using the product which results from the reaction between alkali cellulose and carbon bisulphide.

In all cases (for example in the preparation of plastic masses of all kinds, or thick coatings or the like) in which it is admissible or even desirable to prepare the artificial materials from a parent material poor in water, the products of the reaction as such, i. e. without being diluted or dissolved respectively can be employed. In other cases, for instance, in the production of artificial threads, it is recommended to convert the reaction masses poor in water into solution by adding water or water and caustic alkali or a caustic alkali solution.

Since the practice of the process is (with the exceptions clearly stated herein) exactly as set forth in the aforesaid parent specification (Patent No. 2,021,862) and explained therein by aid of numerous examples, it appears superfluous to repeat here all particulars relating to the carrying out of the present process under various working conditions and to give here examples demonstrating all possible modifications of working the present invention. In conjunction with the detailed description and the example of Specification Nos. 435,649 and 521,020 the following examples appear to be sufficient to illustrate the practical execution of the invention which, however, is by no way limited to these examples:—

*Example I (a) to (i)*

(a) 100 parts of wood-pulp (water content 8 per cent.) or cotton linters (water content 6 to 7 per cent.) are introduced into 2000 parts of caustic soda solution of 18 per cent. strength at a temperature of 15° C. and left therein for 3 hours. The alkali cellulose is then pressed until it weighs in the case of wood-pulp 300 parts and in the case of linters 340 parts; it is shredded at a temperature of 11 to 15° C. for 2½ to 3 hours, whereupon in the case of wood-pulp 40 parts and in the case of linters 60 parts of carbon bisulphide are added, and the carbon bisulphide is allowed to act for about 8 hours at a temperature of 18 to 20° C. Any excess of carbon bisulphide is blown off during 10 to 15 minutes, whereupon to the thus obtained cellulose xanthate that, if desired, may be cooled down to 10 to 15° C., 10 parts of α-dichlorohydrine are added under kneading. A short time after the addition of the α-dichlorohydrine, the temperature of the reacting mass rises to about 26° C. The reacting mass is further kneaded for about 2 hours during which time the temperature slowly drops to 16 to 20° C. After the reacting mass has been kneaded for 2 hours, it is divided into small parts by cutting it or passing through a meat mincing machine. Thereafter the material is dissolved in such a quantity of caustic soda and water as to produce a solution containing about 6.5 to 7 per cent. of the cellulosic body (determinable analytically by precipitation with sulphuric acid, washing until free from acid, extraction with alcohol, ether and pyridine and drying) and 8 per cent. of NaOH. Before being spun, the thus obtained solution is allowed to age for about 96 to 100 hours at 15° C., during which time it is filtered 3 to 4 times through cotton wool, the last filtration taking place shortly before spinning.

The spinning solution is pressed at a speed of 3.3 cc. per minute through a platinum nozzle having 54 perforations of 0.1 mm. diameter, into a bath containing 65 to 67 per cent. of $H_2SO_4$ and having a temperature of 16° C., the length of immersion of the thread in the sulphuric acid being 20 cm. The thread is then allowed to pass for 120 cm. through the air and is wound on a bobbin revolving at a speed which produces a speed of spinning of about 18 m. per minute. Three glass rods or rollers are placed angularly to one another between the spinning bath and the bobbin over which rods the threads are conducted and are thus subjected to an additional stretching or tension. The lower part of the bobbin revolves in water, so that the sulphuric acid is removed or considerably diluted as soon as the thread arrives at the bobbin. The threads are then washed, purified, twisted and finished in the usual manner.

The threads obtained consist of single filiments of about 2 to 2.5 deniers each.

(b) The same mode of operation as in (a), but with the variation that the temperature of the spinning bath is 0° C.

(c) The same mode of procedure as in (a) or (b), but with the difference that the bath contains 70 per cent. of $H_2SO_4$.

(d) The same mode of operation as in (a), or (b), or (c), but with the difference that only 1.6 cc. of the spinning solution is discharged per minute, that the nozzles have 100 perforations of 0.08 mm. diameter, and that the strength of the spinning acid is 60 to 65 per cent. of $H_2SO_4$.

The titre of the single filament is about 0.5 to 0.7 denier.

(e) Mode of operation as in (a), or (b), or (c), with the exception that 3 cc. of the spinning solution are discharged per minute, that the nozzles have 100 apertures of 0.08 mm. diameter, that the speed of spinning is 30 m. per minute, and that the strength of the spinning acid is 60 to 65 per cent. of $H_2SO_4$.

The titre of the single filaments is about 0.7 to 0.9 denier.

(f) The same mode of operation as in (a), or (b), or (c), but with the variation that 6.2 cc. of the spinning solution are discharged per minute, that the nozzles have 100 perforations of 0.08 mm. diameter, and that the speed of spinning is 40 m. per minute.

The titre of the single filaments is about 1 to 1.4 deniers.

(g) The same mode of operation as in (a), but with the difference that 3 cc. of the spinning solution are discharged per minute, that the nozzles have 24 perforations of 0.1 mm. diameter, that the setting bath contains 62 to 65 per cent. of $H_2SO_4$ and has a temperature of 0° C., and that the length of immersion of the thread in the setting bath is 80 cm.

The titre of the single filaments is about 4 to 5.5 deniers.

(h) The process is conducted as in (f), but with the difference that the spinning solution is discharged at a speed of about 14 cc. per minute, that the speed of spinning is about 100 to 120 m. per minute, and that the thread is not subjected to additional stretching.

(i) The same procedure as in (a) to (h), with the exception that the setting bath contains 40 per cent. of $H_2SO_4$.

Example II (a) to (i)

The process is conducted as in any one of the Examples I (a) to (i), but with the exception that, after the addition of the α-dichlorohydrine and before dissolution, the reaction mass is kneaded for 4 to 6 hours.

Example III (a) to (i)

The process is conducted as in any one of the Examples I (a) to (i) or II (a) to (i), but with the difference that, the final reaction mass is dissolved in such a quantity of caustic soda and water, that the solution contains about 6.5 per cent. of the cellulosic body (determinable as described in Example I) and 5 per cent. of NaOH.

Example IV (a) to (i)

The process is conducted exactly as in any one of the Examples I (a) to (i), or II (a) to (i), but with the difference that, instead of the α-dichlorohydrine, 10 parts of ethylene chlorohydrine are employed. The concentrations of the spinning acids are as follows:—

Spinning method (a) and (b) 64 to 67 per cent. of $H_2SO_4$.

Spinning method (c) 70 per cent. of $H_2SO_4$.

Spinning method (d) 58 to 63 per cent. of $H_2SO_4$.

Spinning method (e) 58 to 64 per cent. of $H_2SO_4$.

Spinning method (f) 61 to 64 per cent. of $H_2SO_4$.

Spinning method (g) 62 to 65 per cent. of $H_2SO_4$.

Spinning method (i) 40 per cent. of $H_2SO_4$.

Example V (a) to (i)

The process is conducted as in any one of the Examples IV (a) to (i), but with the exception that, instead of 10 parts, 20 parts of ethylene chlorohydrine are employed.

Example VI (a) to (i)

The process is conducted as in any one of the Examples IV (a) to (i), or V (a) to (i), but with the difference that the final reaction mass is dissolved in such a quantity of caustic soda and water, that the solution contains about 6.5 per cent. of the cellulosic body (determinable as described in Example I) and 5 per cent. of NaOH.

Example VII (a) to (i)

(a) The cellulose xanthate and the crude product of the reaction between the cellulose xanthate and the α-dichlorohydrine are prepared as in Example I (a), but with the difference that as starting cellulose such wood-pulp or linters are used as yield viscose of pronounced high viscosity, and that for the dissolving of the thus obtained product such a quantity of caustic alkali and water is used as to yield a solution containing about 3 per cent. of the cellulosic body (determinable as described in Example I) and 5 per cent. of NaOH.

The thus obtained solution is aged and filtered as in Example I and then spun as follows:—

The spinning solution is squirted at a speed of 3.7 cc. per minute through a platinum nozzle (having 100 holes of 0.08 mm. diameter) into a bath containing 65 per cent. of $H_2SO_4$ and having a temperature of 16° C., the length of immersion of the threads in the sulphuric acid being 80 cm. Then the threads are allowed to pass through the air for 120 cm. and wound on a bobbin revolving at such a speed as to produce a speed of spinning of about 18 m. per minute. In the air passage three glass rods are arranged angularly to one another, over which rods the thread runs, thus applying an additional stretch or tension to the thread. The lower part of the spool revolves in water, so that sulphuric acid is removed or is considerably diluted as soon as the thread arrives at the spool. The threads are then washed, purified, twisted and finished in the usual manner.

The thread obtained in this manner consist of single filaments of about 0.6 to 0.8 denier.

(b) The mode of operation is as in (a), but with the difference that the temperature of the coagulating bath is 4° C.

(c) Mode of procedure as in (a), or (b), but with the exception that the spinning bath contains 70 per cent. of $H_2SO_4$.

(d) Mode of procedure as in (a), or (b), but with the difference that the coagulating bath contains 60 per cent. of $H_2SO_4$.

(e) The same mode of operation as in (a), or (b), or (c), or (d), but with the difference that 6.8 cc. of the spinning solution are discharged per minute and that the speed of spinning is 30 m. per minute.

The titre of the single filaments is about 0.6 to 0.8 denier.

(f) Mode of procedure as in (a), or (b), or (c), or (d), but with the difference that the spinning solution is discharged at a speed of 14.3 cc. per minute, and that the speed of spinning is about 40 m. per minute.

The titre of the silk is about 1 to 1.3 deniers per single filament.

(g) Mode of procedure as in (a), or (b), or (c), or (d), but with the difference that the spinning nozzles have 54 perforations of 0.1 mm. diameter, and that the spinning solution is discharged at a speed of 7.6 cc. per minute.

The titre of the individual filaments is about 2 to 2.6 deniers.

(h) Mode of procedure as in (g), but with the exception that the temperature of the setting bath is minus 5° C.

(i) Mode of operation as in (a), or (b), or (c), or (d), but with the difference that the nozzles have 24 holes of 0.1 mm. diameter, and that the spinning solution is discharged at a speed of 6.8 cc. per minute.

The titre of the single filaments is about 4 to 5 deniers.

(k) Mode of procedure as in (i), but with the difference that the temperature of the setting bath is minus 5° C.

(l) The process is conducted as in (f), but with the difference that the spinning solution is discharged at a speed of about 30 cc. per minute, that the speed of spinning is about 100 to 120 m. per minute, and the thread is not subjected to additional stretching.

*Example VIII (a) to (l)*

The process is conducted as in any one of the Examples VII (a) to (l), but with the difference that, instead of the α-dichlorohydrine, 10 to 20 parts of ethylene chlorohydrine are employed.

*Example IX (a) to (d)*

The process is conducted as in any one of the Examples VII (a) to (d), or VIII (a) to (d), but with the difference that the spinning solution is allowed to age for 24 to 48 hours only.

*Example X (a) to (d)*

The spinning solution is prepared as in Example VII or VIII or IX, and in the fresh state or having been aged for 24, or 48, or 72 hours at 15° C., spun as follows:—

It is pressed at a speed of 14 to 15 cc. per minute through a nozzle having 100 perforations of 0.08 mm. diameter, into a bath containing 10 per cent. of $H_2SO_4$, or into a bath containing 10 per cent. of $H_2SO_4$ and 20 per cent. of $Na_2SO_4$, or into a bath containing 16 per cent. of $H_2SO_4$ and 30 per cent. of $Na_2SO_4$, and having a temperature of 16° C., the length of immersion of the thread in the bath being 80 cm. The thread is then allowed to pass for 165 cm. through the air and is wound on a bobbin revolving at a speed which produces a speed of spinning of about 40 r. per minute. Three glass rods are placed angularly to one another between the spinning bath and the bobbin over which rods the threads are conducted and are thus subjected to an additional stretching or tension. The lower part of the bobbin revolves in water.

The threads obtained consist of single filaments of about 1 to 1.3 deniers each.

(b) Mode of procedure as in (a), but with the difference that the temperature of the spinning bath is 5° C.

(c) Mode of operation as in (a), or (b), but with the difference that 6.5 to 7 cc. of the spinning solution are discharged per minute, and that the speed of spinning is 30 m. per minute.

The single filaments have a titre of about 0.6 to 0.8 denier each.

(d) Mode of procedure as in (a), or (b), but with the exception that 7.5 to 8 cc. of the spinning solution are supplied per minute, that the nozzles have 54 perforations of 0.1 mm. diameter and that the speed of spinning is 18 m. per minute.

*Example XI*

One of the spinning solutions produced according to any one of the foregoing prescriptions is spun in the known manner in one of the following baths:—

(1) In a solution of ammonium sulphate of 25 to 30 per cent. strength, or (2) In a bath consisting of 500 parts of sodium bisulphate, 76 parts of sulphuric acid of 66° Bé., and 587 parts of water, which bath may be kept at room temperature or at a raised temperature, for instance 50° C., or (3) In a bath consisting of 982 parts of water, 180 parts of sodium sulphate, 60 parts of ammonium sulphate, 15 parts of zinc sulphate, 135 parts of glucose and 128 parts of sulphuric acid of 66° Bé.

The coagulated thread is introduced from one of the baths cited into a bath of the following composition:—

(1) Sulphuric acid of 70 per cent. of $H_2SO_4$, or (2) Sulphuric acid of 60 to 65 per cent. of $H_2SO_4$, or (3) Sulphuric acid of 55 per cent. of $H_2SO_4$, or (4) A solution of 13.3 parts of ammonium sulphate in 120 parts by weight of sulphuric acid of 62 to 70 per cent. of $H_2SO_4$, to which 9 to 12 parts of sulphuric acid of 66° Bé. are added.

The temperature of the second bath may be kept below room temperature, for instance at 0 to 10° C., or at room temperature, or even above room temperature, for instance at 25 to 45° C.

The length of immersion of the thread in the second bath may be small, for instance 20 cm. or also larger, for instance 30 to 120 cm. or more.

The threads are stretched by any one of the known methods, namely either in the second bath or after they have left it. This may be arranged by making the distance of the collecting device from the second setting bath very large, or by conducting the threads over one or several rods, hooks, rollers, or differential rollers, which are arranged between the nozzle and the collecting device in the second bath or outside it or at both places.

The threads are collected, while the sulphuric acid is removed or diluted by washing as has previously been described, and the threads are finally washed completely, dried and treated in the manner described in Example I.

The manufacture of staple fibre will be entirely clear from the foregoing examples, and the other materials mentioned in this specification.

In the foregoing examples, in order to obtain the additional stretching, differential rollers of equal or varying speeds may also be used.

When the threads have been washed, they may be heated or steamed at high temperatures (for instance 100° to 110° C.) before or after the drying process.

Any desulphurization or bleaching of the threads may be conducted in the known manner.

The foregoing examples may also be modified, in that the alkali cellulose, before being treated with carbon bisulphide, is allowed to ripen for a shorter period, for instance 24 or 36 hours, or 48 hours, or longer, for instance 60 to 72 hours, at a temperature of 15 to 20° C.

*Example XII*

A spinning solution, produced in the manner described in any one of the foregoing examples is introduced in the known manner into one of the setting baths named in one of the foregoing examples through a suitable hopper or slit, and the coagulated film band, after having been run through this bath, is washed in the known manner and dried.

*Example XIII*

A cotton fabric is impregnated or filled, or coated, one or several times, on a suitable machine, for instance a padding machine, or a backfilling machine, or a spreading machine, with a spinning solution produced in the manner described in one of the foregoing examples, to which solution a filling material, such as talc or China clay (for instance 100 to 200 per cent. calculated on the weight of the cellulose) or a dyestuff or a pigment, such as mica, or lampblack, may be added and without being dried, if necessary in a state of tension, is passed through a bath having the composition of one of the setting baths mentioned in the foregoing examples. The dressed or coated fabric is then washed and dried.

If desired, the extensibility of the artificial material, particularly threads, produced according to the present process may be still more increased by treating them with shrinking agents, for example according to the processes described in my specifications Ser. Nos. 186,575, 308,589, 367,154 and 367,150, now Patents 1,989,098 to 1,989,101 inclusive, and 2,001,621.

As a guiding line with regard to the question whether or not the alkali cellulose should be allowed to mature before being brought together with the carbon bisulphite may, among others, serve the desired viscosity of the solution which is to be worked up into artificial material in general and artificial threads in particular, and in connection therewith the viscosity of the kind of cellulose contemplated. If it is desired to give the solution a definite viscosity (for instance 4 to 7 compared with glycerine) then the alkali cellulose produced from the kind of cellulose contemplated, is subjected to a maturing process, if without maturing this kind of cellulose yields a higher viscosity. If, however, it exhibits from the first the desired grade of viscosity, that is without maturing, the maturing is superfluous. Now, as the viscosities of the different kinds of cellulose on the market (linters and wood-pulp) differ very much from one another, the question of maturing depends in most cases on the one hand on the viscosity desired of the initial solution intended for the manufacture of artificial material, and on the other hand on the viscosity of the kind of cellulose being worked.

Instead of α-dichlorohydrine or ethylene chlorohydrine in the foregoing examples a halogen derivative or other ester of a di- or polyhydric alcohol, or a cyclic ether of a di- or polyhydric alcohol, or an inorganic ester of a monohydric alcohol, or a halogen derivative of an ether of a monohydric alcohol, or a halogen derivative of an aldehyde or ketone that may be regarded as being derived from a monohydric alcohol, or a halogen olefine, or a halogen fatty acid or a salt thereof, or a di- or polyhalogen-paraffin, or a halogen derivative of an oxyalkylamine or oxyaralkylamine or a salt or derivative thereof, can be used.

To avoid alternative expressions, the prefix "poly-" as used in the claim is intended to embrace "di", i. e. the prefix "poly-" means "containing at least two", although I am of course aware that some writers have heretofore used this term in the sense of "containing more than two".

What I claim is:—

In the manufacture of artificial materials, the herein described step which comprises acting upon cellulose xanthate, in the absence of a sufficient amount of water to dissolve the same in the presence of an alkali, with an organic compound capable of reacting with cellulose contained in cellulose xanthate, such compound being selected from the group consisting of:— a. Halogen olefines, namely unsaturated halogen derivatives of unsaturated hydrocarbons, b. Poly-halogen-paraffins, c. Halogen hydracid esters of monohydric alcohols, d. Halogen hydracid esters of polyhydric alcohols, e. Halogen derivatives of ethers of mono-hydric alcohols, halogen derivatives of aldehydes and of ketones which may be regarded as being derived from mono-hydric alcohols, f. Halogen alkylamines and halogen aralkylamines, g. Acid halides, including benzoyl halides, h. Sulphochlorides of aromatic hydrocarbons, including ortho- and para-toluene sulphochloride, naphthalene sulphochloride, i. Quinoline sulphochloride, j. Halogen derivative of substituted benzolated chloranisol, k. Halogen derivatives of ethers of aminophenols, including chloro-anisidine and O- and N-substitution derivatives thereof, l. Halogen derivatives of pseudophenols, methylene quinones and quinols, including ortho-oxymesityl chloride and piperonyl chloride, m. Sulphochlorides of tertiary amines, n. Sulphochlorides of salicylic acid and chloro- and nitro- substitution products thereof, and sulphonamide, o. Halogen derivatives of aromatic monocarboxylic acids, p. Halogen derivatives of cyanogen, including cyanogen halides, and cyanuric halides (tricyanogen halides), q. Halogen derivatives of nitrobenzene, r. Urea halides, alkylurea halides, phenylurea halides, and phenyl-alkylurea halides, s. Halogen fatty acids and their salts.

t. Phenyl-halogen fatty acids including phenyl-chlor-acetic acid and phenyl-chloro-propionic acid and phenyl-chloro-lactic acid and phenyl-chloro-oxypropionic acid and their homologues, u. Halogen derivatives of heterocyclic ring compounds containing N in the ring, including halogen derivatives of pyridine and its homologues and halogen derivatives of quinoline and its homologues and halogen derivatives of isoquinoline and its homologues.

v. Halogen derivatives of phenyl olefine alcohols and oxy-phenyl olefine alcohols including cinnamic alcohol dibromide, w. Halogen derivatives of olefine benzenes, including omega-chloro-styrol and dichloro styrol, x. Halogen hydracid esters of phenyl glycols, including β-phenyl-propylene-glycol-α-chlorhydrin and benzyl-glycol-chlorhydrin and styrol dichloride, which substances are all halogen compounds capable of reacting upon cellulose xanthate by etherification, to introduce an organic radical in place of a hydroxyl hydrogen atom, while still leaving at least a part of the CSS-groups contained in the cellulose xanthate, and only thereafter, dissolving the reaction product in an alkaline solution.

LEON LILIENFELD.